United States Patent
Yamazaki et al.

(10) Patent No.: US 6,703,101 B2
(45) Date of Patent: Mar. 9, 2004

(54) MAGNETIC RECORDING MEDIUM

(75) Inventors: Nobuo Yamazaki, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 63 days.

(21) Appl. No.: 10/183,522

(22) Filed: Jun. 28, 2002

(65) Prior Publication Data

US 2003/0082409 A1 May 1, 2003

(30) Foreign Application Priority Data

Jun. 29, 2001 (JP) .................................... P2001-198884

(51) Int. Cl.[7] .................................................. G11B 5/82
(52) U.S. Cl. ................. 428/65.3; 428/141; 428/694 BH
(58) Field of Search ........................ 428/141, 694 BH, 428/65.3

(56) References Cited

U.S. PATENT DOCUMENTS 6,475,598 B1 * 11/2002 Naoe et al. ................. 428/141
6,521,361 B2 * 2/2003 Ejiri et al. ............ 428/694 BN
6,582,815 B2 * 6/2003 Naoe et al. .................. 428/328

FOREIGN PATENT DOCUMENTS

JP  2000-251243  9/2000

* cited by examiner

Primary Examiner—Steven A. Resan
(74) Attorney, Agent, or Firm—Sughrue Mion, PLLC

(57) ABSTRACT

A magnetic recording medium for reproduction of MR head comprising a support having thereon a substantially non-magnetic low layer and a magnetic layer comprising ferromagnetic hexagonal system ferrite particles dispersed in a binder, in this order, wherein a power spectrum of density at a spatial frequency of 100/mm having frequency-analyzed a surface roughness of the magnetic layer is 10,000 $nm^3$ or less, the power spectrum of density at a spatial frequency of 500/mm is 50 to 500 $nm^3$ and an average tabular diameter of the ferromagnetic hexagonal system ferrite particles is 15 to 35 nm.

4 Claims, No Drawings

MAGNETIC RECORDING MEDIUM

FIELD OF THE INVENTION

The present invention relates to a coating type magnetic recording medium for high recording density, and in particular to a magnetic recording particulate medium (i.e., a coated-type magnetic recording medium) for high density recording comprising a magnetic layer and a substantially non-magnetic low layer including fine particles of hexagonal (system) ferrite in an uppermost layer.

BACKGROUND OF THE INVENTION

A magnetic head (induction-type magnetic head) having a working principle of electromagnetic induction has been conventionally used and distributed. But, for using it in a recording/reproducing range of higher density, a limitation seems to arise. That is, for obtaining a large reproduction output, a coiling number of a reproducing head must be increased, but there are problems that inductance increases and resistance in a high frequency becomes much so that the reproduction output goes down consequently. A reproducing head having a working principle of MR (magnetoresistance) has recently been proposed and used in hard disks, etc. MR (i.e., magnetoresistive) head can obtain the reproduction output of several times than an induction-type magnetic head, and besides since it does not use the induction coil, machine noises as impedance noises largely reduce, and a large SN ratio can be obtained by lowering noises of a magnetic recording medium. In other words, if reducing noises of the magnetic recording medium having hidden conventional machine noises, a good recording reproduction can be carried out and the characteristics for high density recording can be extremely improved. The MR head has a particular phenomenon called as a thermal asperity. If a recording medium strongly contacts to the MR head, a thermal energy thereby induces changes in resistance of the MR head, and reproduction signals disorder and occur errors. In particular, a special attention should be paid to flexible media as flexible disks or tapes, because they are ready for making irregular contacts to the MR heads.

SUMMARY OF THE INVENTION

An object of the present invention is to provide a coating-type magnetic recording medium for reproduction of MR head which has conventionally been used, and is excellent in productivity, cheaply available, little in the thermal asperity, and superior in property of high density and low in noises.

The inventors made earnest studies for providing a magnetic recording medium which is good in an electromagnetic (conversion) characteristic, less in the thermal asperity which is particular to reproduction of the MR head, and is by far improved in the high density recording characteristic, and consequently they found provision of the high density recording property, and have come to the present invention.

That is, the present invention relates to a magnetic recording medium for reproduction of MR head comprising a support having thereon a substantially non-magnetic low layer and a magnetic layer comprising ferromagnetic hexagonal system ferrite particles dispersed in a binder, in this order, wherein a power spectrum of density at a spatial frequency of 100/mm having frequency-analyzed a surface roughness of the magnetic layer is 10,000 nm$^3$ or less, the power spectrum of density at a spatial frequency of 500/mm is 50 to 500 nm$^3$, and an average tabular diameter of the ferromagnetic hexagonal system ferrite particles is 15 to 35 nm.

Preferable embodiments of the present invention are as follows.

(1) The magnetic recording medium as described above, wherein the power spectrum of density at a spatial frequency of 100/mm having frequency-analyzed the surface roughness of the support, is 50,000 nm$^3$ or less, and the power spectrum of density at a spatial frequency of 500/mm is 100 to 5,000 nm$^3$.

(2) The magnetic recording medium as described above wherein projections (i.e., protrusions) having a height of 0.1 to 0.5 $\mu$m which are present on the surface of the support, are 0.5 pieces/mm$^2$ or less.

(3) The magnetic recording medium as described above, wherein the magnetic recording medium is disk- or tape-shaped.

The present invention specifies the power spectrum of density at a spatial frequency of 100/mm having frequency-analyzed the surface roughness of the magnetic layer, the power spectrum of density at a spatial frequency of 500/mm, and the average tabular diameter of the ferromagnetic hexagonal system ferrite particles.

Herein, the power spectrum of density of each spatial frequency means a degree of a specific wavelength component in the surface roughness.

If the power spectrum of density at a spatial frequency of 100/mm exceeds 10,000 nm$^3$, the electromagnetic (conversion) characteristic is deteriorated, and the power spectrum of density at a spatial frequency of 100/mm is preferably 7,000 nm$^3$ or less, and more preferably 5,000 nm$^3$ or less. A lower limit of the power spectrum of density at a spatial frequency of 100/mm is not especially provided, and the smaller, the better.

If the power spectrum of density at a spatial frequency of 500/mm is less than 50 nm$^3$, the thermal asperity is much. If the power spectrum of density exceeds 500 nm$^3$, the electromagnetic (conversion) characteristic is worsened. The power spectrum of density at a spatial frequency of 500/mm is preferably 100 to 400 nm$^3$. A reason why the power spectrum of density at a spatial frequency of 500/mm gives influences to the thermal asperity is not apparent, but it is assumed to moderate strong impact between the MR head and fine projections.

The average tabular diameter of the hexagonal system ferrite used to the magnetic layer means an average of a hexagonal tabular diameter, and it is 15 to 35 nm, preferably 20 to 35 nm, and more preferably 22 to 30 nm. If the average tabular diameter is larger than 35 nm, noises are made large owing to the ferromagnetic particle itself, and besides it is difficult to obtain distribution in intensity having frequency-analyzed the surface roughness of the present invention. If the average tabular diameter is smaller than 15 nm, a dispersion liquid is not enough obtained by a nowadays' dispersion technique. In the present invention, the average tabular diameter of the hexagonal system ferrite is 15 to 35 nm for bringing about large effects.

There are several methods for bringing the power spectrum of density into the range of the present invention. For example, enumerated are to control the power spectrum of density of the support, to control adjustment of a coating solution for forming the non-magnetic lower layer and the magnetic layer, to select coating methods, to select treating conditions of the calendering, or to polish the surface after the calender. The present invention can be accomplished by combination of these methods.

In the above methods, those which give comparatively large influences for controlling the power spectrum of density of the medium, are to control the power spectrum of density of the support, and to select the average tabular diameters of the hexagonal system ferrite. Projections on the surface of the support appear on the surface of the magnetic recording medium, so that the thermal asperity is easy to occur, and therefore it is desirable that projections of 0.1 to 0.5 μm in height on the surface of the support for the present invention are 0.5 pieces/mm² or less.

DETAILED DESCRIPTION OF THE INVENTION

Magnetic Layer

The magnetic recording medium may have a magnetic layer either on one side only or on each side of the support. When a magnetic layer is to be formed on a lower layer, a coating solution for forming the magnetic layer (also called "upper layer" or "upper magnetic layer") may be applied either by the wet-on-wet (W/W) method in which it is applied while a coating solution for lower-layer formation which has been applied is still in a wet state or by the wet-on-dry (W/D) method in which the coating solution for magnetic-layer formation is applied after the coating solution for lower-layer formation applied has been dried. From the standpoint of production efficiency, simultaneous or successive wet-on-wet coating is preferred. In the case of disks, however, the wet-on-dry coating method also is sufficient. The use of simultaneous or successive wet-on-wet (W/W) coating in forming a multilayer constitution is advantageous in that surface-treating steps including a calendering step can be effectively conducted because the upper and lower layers can be formed simultaneously. Thus, the resulting upper magnetic layer can have improved surface roughness even when exceedingly thin.

Ferromagnetic Particle

The ferromagnetic particles used in the magnetic layer are particles of a hexagonal ferrite. Examples thereof include substitution products of barium ferrite, strontium ferrite, lead ferrite, or calcium ferrite and cobalt substitution products. Specific examples thereof include barium ferrite and strontium ferrite each of the magnetoplumbite type, magnetoplumbite-type ferrites whose surface has been coated with spinel, and magnetoplumbite-type barium ferrite and strontium ferrite each partly containing a spinel phase. Such ferrites may contain atoms of elements other than the given elements. Examples of such optional elements include Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. In general, ferrites to which elements such as Co—Zn, Co—Ti, Co—Ti—Zr, Co—Ti—Zn, Ni—Ti—Zn, Nb—Zn—Co, Sb—Zn—Co, or Nb—Zn have been added can be used. Some ferrites contain peculiar impurities depending on raw materials or production processes.

The average tabular ratio (arithmetic mean of tabular diameter/tabular thickness) of the magnetic particles is desirably from 1 to 15, preferably from 1 to 7. Although small values of the average aspect ratio are preferred from the standpoint of attaining a higher packing property in the magnetic layer, sufficient orientation cannot be obtained therewith. On the other hand, values of the average aspect ratio larger than 15 result in increased noises due to particle stacking. When the magnetic particles have a size within that range, the particles have a specific surface area as measured by the BET method ($S_{BET}$) of from 10 to 100 m²/g. The specific surface area roughly agrees with the arithmetic mean calculated from the particle tabular diameter and tabular thickness. The narrower the particle tabular diameter/tabular thickness distribution, the more the magnetic particles are usually preferred. A numerical comparison can be made by measuring arbitrarily selected five hundred particles on a TEM photograph of each particulate material. Although many particulate magnetic materials do not have a normal distribution, the magnetic particles to be used in the present invention are ones whose coefficient of variance represented by standard deviation based on the calculated average tabular diameter (σ/average tabular diameter or average tabular thickness) is generally from 0.1 to 2.0, preferably from 0.1 to 1.0, more preferably from 0.1 to 0.5. For obtaining magnetic particles having a narrow particle size distribution, a technique is being used in which a reaction system for particle formation is kept as even as possible and the particles yielded are subjected to a treatment for distribution improvement. Examples of this treatment include a method in which the particles are treated with an acid solution to selectively dissolve ultrafine particles therein. The hexagonal-ferrite fine particles have an average particle volume of generally from 1,000 to 10,000 nm³, preferably from 1,500 to 8,000 nm³, more preferably from 2,000 to 8,000 nm³.

Magnetic materials having a coercive force $H_c$ of about from 40 to 400 kA/m can usually be prepared. Although higher values of $H_c$ are advantageous for high-density recording, $H_c$ is limited by the capacity of the recording head to be used. In the present invention, the $H_c$ of the magnetic material is about from 159 to 397 kA/m, preferably from 159 to 320 kA/m. When a head having a saturation magnetization exceeding 1.4 T is to be used, it is preferred to employ a magnetic material having an $H_c$ of 175 kA/m or higher. $H_c$ can be regulated by regulating particle size (tabular diameter/tabular thickness), the kind and amount of an element incorporated, the substitution site for the element, reaction conditions for particle formation, etc. The saturation magnetization $\sigma_s$ of the magnetic material is generally from 40 to 80 A.m²/kg. The finer the particles, the more the $\sigma_s$ tends to become low. Well-known techniques for improving $\sigma_s$ include to combine a magnetoplumbite ferrite with a spinel ferrite and to select the kind and amount of an element to be incorporated. It is also possible to use a W-type hexagonal ferrite. Furthermore, a technique is being used in which before a magnetic material is dispersed, the surface of the magnetic particles is treated with a substance suitable for the dispersion medium and polymer to be used. As the surface-treating agent, is used an inorganic compound or an organic compound. Representative examples of such compounds include the oxides or hydroxides of silicon, aluminum, and phosphorus, various silane coupling agents, and various titanium coupling agents.

The amount of the surface-treating agent to be used may be from 0.1 to 10% based on the magnetic material. The pH of the magnetic material also is important for dispersion. The optimal value of pH is generally in the range of about from 4 to 12 depending on the dispersion medium and polymer to be used. However, a pH of about from 6 to 11 is selected from the standpoints of the chemical stability of the medium and storage stability. The water content of the magnetic material also influences dispersibility. A water content of from 0.01 to 2.0% is generally selected although the optimal value thereof depends on the dispersion medium and polymer to be used. Examples of processes for producing a hexagonal ferrite include: a glass crystallization method which comprises mixing starting materials such as barium oxide, iron oxide, an oxide of a metal with which iron is to be substituted, and boron oxide as a glass-forming substance so as to result in a desired ferrite composition, melting the mixture, rapidly cooling the melt to form an amorphous material, and subsequently subjecting the amorphous material to a heat treatment and then to washing and pulverizing to thereby obtain a crystalline powder of barium ferrite; a hydrothermal reaction method which comprises neutralizing a solution of metal salts having a barium ferrite composition with an alkali, removing the by-product, subsequently heating the mixture in a liquid phase at 100° C. or higher, and then subjecting the mixture to washing, drying, and pulverization to obtain a crystalline powder of barium ferrite; and a coprecipitation method which comprises neutralizing a solution of metal salts having a barium ferrite composition with an alkali, removing the by-product, subsequently drying the mixture, treating the reaction product at 1,100° C. or lower, and then pulverizing it to obtain a crystalline powder of barium ferrite. The hexagonal ferrite to be used in the present invention may be one prepared by any process.

Nonmagnetic Layer

Next, the lower layer is explained in detail, below.

The lower layer is not particularly limited in constitution as long as it is substantially nonmagnetic. However, it usually comprises at least a resin. Preferred examples thereof include a layer comprising a resin and particles, e.g., inorganic particles or organic particles, dispersed in the resin. Although the inorganic particles are usually preferably nonmagnetic particles, magnetic particles may be used as long as the lower layer is substantially nonmagnetic.

The nonmagnetic particles can be selected, for example, from inorganic compounds such as metal oxides, metal carbonates, metal sulfates, metal nitrides, metal carbides, and metal sulfides. Examples of such inorganic compounds include α-alumina having an α-conversion rate of 90% or higher, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These inorganic compounds may be used alone or in combination of two or more thereof. Especially preferred are titanium dioxide, zinc oxide, the iron oxides, and barium sulfate from the standpoints of the narrowness of particle size distribution and the availability of many techniques for function impartation. More preferred of these are titanium dioxide and α-iron oxide. The particle size of such nonmagnetic particles is preferably from 0.005 to 2 $\mu$m. However, particulate nonmagnetic materials differing in particle size may be used in combination according to need. Alternatively, a single particulate nonmagnetic material having a widened particle diameter distribution may be used so as to produce the same effect. Especially preferred nonmagnetic particles have a particle size of from 0.01 to 0.2 $\mu$m. Especially when the nonmagnetic particles are a granular metal oxide, the average particle diameter thereof is preferably 0.08 $\mu$m or smaller. When the nonmagnetic particles are an acicular metal oxide, the long-axis length thereof is preferably 0.3 $\mu$m or shorter, more preferably 0.2 $\mu$m or shorter. The tap density thereof is generally from 0.05 to 2 g/mL, preferably from 0.2 to 1.5 g/mL. The water content of the nonmagnetic particles is generally from 0.1 to 5% by weight, preferably from 0.2 to 3% by weight, more preferably from 0.3 to 1.5% by weight. The pH of the nonmagnetic particles is generally from 2 to 11, and is preferably in the range of from 5.5 to 10.

The specific surface area of the nonmagnetic particles is generally from 1 to 100 m$^2$/g, preferably from 5 to 80 m$^2$/g, more preferably from 10 to 70 m$^2$/g. The crystallite size of the nonmagnetic particles is preferably from 0.004 to 1 $\mu$m, more preferably from 0.04 to 0.1 $\mu$m. The oil absorption amount thereof as measured with DBP (dibutyl phthalate) is generally from 5 to 100 mL/100 g, preferably from 10 to 80 mL/100 g, more preferably from 20 to 60 mL/100 g. The specific gravity thereof is generally from 1 to 12, preferably from 3 to 6. The particle shape thereof may be any of acicular, spherical, polyhedral, and platy shapes. The Mohs' hardness thereof is preferably from 4 to 10. The nonmagnetic particles have an SA (stearic acid) adsorption amount of generally from 1 to 20 $\mu$mol/m$^2$, preferably from 2 to 15 $\mu$mol/m$^2$, more preferably from 3 to 8 $\mu$mol/m$^2$. The pH thereof is preferably in the range of from 3 to 6. The nonmagnetic particles are preferably subjected to a surface treatment to thereby cause Al$_2$O$_3$, SiO$_2$, TiO$_2$, ZrO$_2$, SnO$_2$, Sb$_2$O$_3$, ZnO, or Y$_2$O$_3$ to be present on the surface of the particles. Especially preferred are Al$_2$O$_3$, SiO$_2$, TiO$_2$, and ZrO$_2$ from the standpoint of enhancing dispersibility. More preferred of these are Al$_2$O$_3$, SiO$_2$, and ZrO$_2$. These may be used in combination of two or more thereof or may be used alone.

The surface treatment may be conducted by suitable methods according to purposes. For example, a surface treatment layer formed by coprecipitation may be used. Alternatively, use may be made of a method in which alumina is deposited first and this surface layer is then treated with silica or a method in which the alumina treatment and silica treatment are conducted in the reversed order. Although a porous surface treatment layer may be formed according to purposes, it is generally preferred to form a surface treatment layer which is homogeneous and dense.

Specific examples of the nonmagnetic particles for use in the lower layer include Nanotite manufactured by Showa Denko K.K.; HIT-100 and ZA-G1 manufactured by Sumitomo Chemical Co., Ltd.; α-hematite DPN-250, DPN-250BX, DPN-245, DPN-270BX, DPN-500BX, DBN-SA1, and DBN-SA3 manufactured by Toda Kogyo Corp.; titanium oxide TTO-51B, TTO-55A, TTO-55B, TTO-55C, TTO-55S, TTO-55D, and SN-100 and α-hematite E270, E271, E300, and E303 manufactured by Ishihara Sangyo Kaisha, Ltd.; titanium oxide STT-4D, STT-30D, STT-30, and STT-65C and α-hematite α-40 manufactured by Titan Kogyo K.K.; MT-100S, MT-100T, MT-150W, MT-500B, MT-600B, MT-100F, and MT-500HD manufactured by Tayca Co., Ltd.; FINEX-25, BF-1, BF-10, BF-20, and ST-M manufactured by Sakai α-Chemical Industry Co., Ltd.; DEFIC-Y and DEFIC-R manufactured by Dowa Mining Co., Ltd.; AS2BM and TiO$_2$ P25 manufactured by Nippon Aerosil Co., Ltd.; 100A and 500A manufactured by Ube Industries, Ltd.; and nonmagnetic materials obtained by burning these. Especially preferred nonmagnetic particles are titanium dioxide particles and α-iron oxide particles.

A carbon black may be incorporated into the lower layer, whereby the well-known effects of lowering the surface electrical resistance $R_s$ and reducing the light transmittance can be prepared and, simultaneously therewith, a desired value of micro-Vickers hardness can be obtained. It is also possible to incorporate a carbon black into the lower layer to thereby enable the layer to have the effect of storing a lubricant therein. Examples of the kinds of carbon blacks usable in the present invention include furnace black for rubbers, thermal black for rubbers, coloring black, and acetylene black. The carbon black to be incorporated into the lower layer should be one which has been optimized with respect to the following properties according to the desired effect. Use of a combination of two or more carbon blacks may produce an enhanced effect.

The carbon black to be incorporated into the lower layer has a specific surface area of generally from 100 to 500 m$^2$/g, preferably from 150 to 400 m$^2$/g, and a DBP absorption amount of generally from 20 to 400 mL/100 g, preferably from 30 to 400 mL/100 g. The particle diameter of the carbon black is generally from 5 to 80 nm, preferably from 10 to 50 nm, more preferably from 10 to 40 nm. The carbon black preferably has a pH of from 2 to 10, a water content of from 0.1 to 10%, and a tap density of from 0.1 to 1 g/mL. Specific examples of carbon blacks usable in the present invention include BLACKPEARLS 2000, 1300, 1000, 900, 800, 880, 700, and VULCAN XC-72 manufactured by Cabot Corp.; #3050B, #3150B, #3250B, #3750B, #3950B, #950, #650B, #970B, #850B, MA-600, MA-230, #4000, and #4010 manufactured by Mitsubishi Chemical Industries Ltd.; CONDUCTEX SC, RAVEN 8800, 8000, 7000, 5750, 5250, 3500, 2100, 2000, 1800, 1500, 1255, and 1250 manufactured by Columbian Carbon Co.; and Ketjen Black EC manufactured by Akzo N.V. Such carbon blacks may be surface-treated with a dispersant or the like or grafted with a resin before use. A carbon black whose surface has been partly graphitized may also be used. Before being added to a coating solution, the carbon black may be dispersed in a binder. Those carbon blacks can be used in an amount of 50% by weight or less based on the inorganic particles and in an amount of 40% by weight or less based on the total amount of the nonmagnetic layer. Those carbon blacks can be used alone or in combination of two or more thereof. With respect to carbon blacks usable in the present invention, reference may be made to, for example, *Kâbon Burakku Binran* (edited by Carbon Black Association, Japan).

Organic particles may be added to the lower layer according to purposes. Examples thereof include acrylic/styrene resin particles, benzoguanamine resin particles, melamine resin particles, and phthalocyanine pigments. Also usable are polyolefin resin particles, polyester resin particles, polyamide resin particles, polyimide resin particles, and poly(fluoroethylene) resins. For producing such organic particles, processes such as those described in Japanese Patent Application (Laid-Open) Nos. 18564/1987 and 255827/1985 may be used.

Binder resins, lubricants, dispersants, additives, solvents, methods for dispersion, and others usable for forming the lower layer may be the same as those for the magnetic layer which will be described later. In particular, with respect to the amounts and kinds of binder resins and the amounts and kinds of additives and dispersants, well-known techniques for forming magnetic layers are applicable.

Binder

As the binder for the present invention is used any of well-known thermoplastic resins, thermosetting resins, and reactive resins and mixtures of these. The thermoplastic resins are ones having a glass transition temperature of from −100 to 150° C., a number-average molecular weight of from 1,000 to 200,000, preferably from 10,000 to 100,000, and a degree of polymerization of about from 50 to 1,000.

Examples of such thermoplastic resins include polymers or copolymers comprising units of one or more of vinyl chloride, vinyl acetate, vinyl alcohol, maleic acid, acrylic acid, acrylic acid esters, vinylidene chloride, acrylonitrile, methacrylic acid, methacrylic acidesters, styrene, butadiene, ethylene, vinylbutyral, vinyl acetal, and vinyl ethers as constituent units, and further include polyurethane resins and various rubbery resins. Examples of the thermosetting resins or reactive resins include phenolic resins, epoxy resins, curable polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. These resins are described in detail in *Purasuchikku Handobukku*, published by Asakura Shoten. Well-known electron beam-curable resins may be used for forming each layer. Examples of these resins and processes for producing these are described in detail in Japanese Patent Application (Laid-Open) No. 256219/1987. The resins enumerated above may be used alone or in combination of two or more thereof. However, preferred examples thereof include combinations of at least one member selected from vinyl chloride resins, vinyl chloride/vinyl acetate copolymers, vinyl chloride/vinyl acetate/vinyl alcohol copolymers, and vinyl chloride/vinyl acetate/maleic anhydride copolymers with a polyurethane resin, and further include combinations of the at least one member, a polyurethane resin, and a polyisocyanate.

The polyurethane resin may have a well-known structure such as a polyester polyurethane, polyether polyurethane, polyether polyester polyurethane, polycarbonate polyurethane, polyester polycarbonate polyurethane, or polycaprolactone polyurethane. For obtaining further improved dispersibility and durability, it is preferred to use, according to need, one or more of the above-enumerated binders which have, incorporated therein through copolymerization or addition reaction, polar groups of at least one kind selected from —COOM, —SO$_3$M, —OSO$_3$M, —P=O(OM)$_2$, —O—P=O(OM)$_2$ (wherein M is a hydrogen atom or an alkali metal), OH, NR$_2$, N$^+$R$_3$ (R is a hydrocarbon group), an epoxy group, SH, CN, and the like. The amount of such polar groups is from $10^{-1}$ to $10^{-8}$ mol/g, preferably from $10^{-2}$ to $10^6$ mol/g.

Specific examples of those binders that can be used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, MPR-TM, and MPR-TAO manufactured by Nisshin Chemical Co., Ltd.; 1000W, DX80, DX81, DX82, DX83, and 100FD manufactured by Denki Kagaku Kogyo K.K.; MR-104, MR-105, MR110, MR100, MR555, and 400X-110A manufactured by Nippon Zeon Co., Ltd.; Nippollan N2301, N2302, and N2304 manufactured by Nippon Polyurethane Industry Co. Ltd.; Pandex T-5105, T-R3080, T-5201, Burnock D-400, D-210-80, Crisvon 6109, and 7209 manufactured by Dainippon Ink & Chemicals, Inc.; Vylon UR8200, UR8300, UR8700, RV530, and RV280 manufactured by Toyobo Co., Ltd.; Daiferamine 4020, 5020, 5100, 5300, 9020, 9022, and 7020 manufactured by Dainichiseika Kogyo K.K.; MX5004 manufactured by Mitsubishi Chemical Industries Ltd.; Sunprene SP-150 manufactured by Sanyo Chemical Industries, Ltd.; and Salan F310 and F210 manufactured by Asahi Chemical Industry Co., Ltd.

The amount of the binder to be used for forming the nonmagnetic layer or magnetic layer is in the range of generally from 5 to 50% by weight (i.e., by mass), preferably from 10 to 30% by weight, based on the nonmagnetic particles or the ferromagnetic particles. In the case of employing a vinyl chloride resin, it is preferred to use the resin in an amount of from 5 to 30% by weight in combination with from 2 to 20% by weight polyurethane resin and from 2 to 20% by weight polyisocyanate. However, a polyurethane alone or a combination of a polyurethane and an isocyanate alone may be used, for example, when there is a possibility that a slight amount of chlorine might be released to cause head corrosion. In the case of using a polyurethane in the present invention, this resin is desirably one having a glass transition temperature of from −50 to 150° C., preferably from 0 to 100° C., more preferably from 30 to 90° C., an elongation at break of from 100 to 2,000%, a stress at break of from 0.05 to 10 kg/mm$^2$ (0.49 to 98 MPa), and a yield point of from 0.05 to 10 kg/mm$^2$ (0.49 to 98 MPa).

The magnetic recording medium can have two or more coating layers. Consequently, it is, of course, possible to form the individual layers so that these layers differ from each other in binder amount, the proportion of a vinyl chloride resin, polyurethane resin, polyisocyanate, or another resin in the binder, the molecular weight and polar group content of each resin contained in the magnetic layer, the aforementioned physical properties of a resin, etc., according to need. Rather than being thus regulated, these factors should be optimized for each layer. For attaining this, well-known techniques concerning multilayered magnetic layers are applicable. For example, in the case of forming layers having different binder amounts, an increase in binder amount in the magnetic layer is effective in diminishing the scratches of the magnetic layer surface, while an increase in binder amount in the nonmagnetic layer is effective in imparting flexibility thereto and thereby improving head touching.

Examples of the polyisocyanate used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate, products of the reactions of these isocyanates with polyhydric alcohols, and polyisocyanates formed through condensation of isocyanates. These isocyanates are commercially available under the trade names of: Coronate L, Coronate HL, Coronate 2030, Coronate 2031, Millionate MR, and Millionate MTL manufactured by Nippon Polyurethane Industry Co., Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co., Ltd. For each layer, these polyisocyanates may be used alone, or used in combination of two or more thereof, taking advantage of a difference in curing reactivity.

Carbon Black, Abrasive Material

The carbon black for use in the magnetic layer maybe furnace black for rubbers, thermal black for rubbers, coloring black, acetylene black, or the like. The carbon black preferably has a specific surface area of from 5 to 500 m$^2$/g, a DBP absorption amount of from 10 to 400 mL/100 g, an average particle diameter of from 5 to 300 nm, preferably from 10 to 250 nm, more preferably from 20 to 200 nm, a pH of from 2 to 10, a water content of from 0.1 to 10%, and a tap density of from 0.1 to 1 g/ml. Specific examples of carbon blacks usable in the present invention include BLACKPEARLS 2000, 1300, 1000, 900, 905, 800, 700, and VULCAN XC-72 manufactured by Cabot Corp.; #80, #60, #55, #50, and #35 manufactured by Asahi Carbon Co., Ltd.; #2400B, #2300, #900, #1000, #30, #40, and #10B manufactured by Mitsubishi Chemical Industries Ltd.; CONDUC-TEX SC, RAVEN 150, 50, 40, and 15, and RAVEN-MT-P manufactured by Columbian Carbon Co.; and Ketjen Black EC manufactured by Japan EC Co. These carbon blacks may be surface-treated with a dispersant or another agent or grafted with a resin before use. A carbon black whose surface has been partly graphitized may also be used.

Before being added to a magnetic coating solution, the carbon black may be dispersed in a binder. Those carbon blacks can be used alone or in combination. In the case of using a carbon black, its amount is preferably from 0.1 to 30% based on the magnetic material. The carbon black incorporated in the magnetic layer functions to prevent static change in the layer, to reduce the coefficient of friction of the layer, to impart a light shielding property for the layer, and to improve the film strength. Such effects are prepared to different degrees depending on the kind of carbon black used. Consequently, it is, of course, possible in the present invention to properly use carbon blacks according to purposes so as to give an upper magnetic layer and a lower nonmagnetic layer which differ in the kind, amount, and combination of carbon blacks, on the basis of the aforementioned properties including particle size, oil absorption amount, electrical conductivity, and pH. Rather than being thus regulated, these factors should be optimized for each layer. With respect to carbon blacks usable in the magnetic layer, reference may be made to, for example, Kabon Burakku Binran (edited by Carbon Black Association).

Abrasive materials usable in the present invention are well-known abrasive materials mostly having a Mohs' hardness of 6 or higher. Examples thereof include α-alumina having an α-conversion rate of 90% or higher, β-alumina, siliconcarbide, chromiumoxide, ceriumoxide, α-iron oxide, corundum, artificial diamond, silicon nitride, silicon carbide, titanium carbide, titanium oxide, silicon dioxide, and boron nitride. These may be used alone or in combination. A composite made up of two or more of these abrasive materials (e.g., one obtained by surface-treating one abrasive material with another) may also be used. Although in some cases these abrasive materials contain compounds or elements other than the main component, the same effect is obtained with such abrasive materials as long as the content of the main component is 90% or higher. These abrasive materials have a particle size of preferably from 0.01 to 2 μm, more preferably from 0.05 to 1.0 μm, most preferably from 0.05 to 0.5 μm. An abrasive material having a narrower particle size distribution is preferred especially for enhancing electromagnetic characteristics. For improving durability, abrasive materials having different particle sizes may be used in combination according to need. Alternatively, a single abrasive material having a widened particle diameter distribution may be used so as to produce the same effect. The abrasive material to be used preferably has a tap density of from 0.3 to 2 g/ml, a water content of from 0.1 to 5%, a pH of from 2 to 11, and a specific surface area of from 1 to 30 m$^2$/g. Although abrasive materials that can be used in the present invention may have any particle shape selected from the acicular, spherical, and dice forms, a particle shape having a sharp corner as part of the contour is preferred because abrasive materials of this shape have high abrasive properties. Specific examples of abrasive materials usable in the present invention include AKP-12, AKP-15, AKP-20, AKP-30, AKP-50, HIT 20, HIT-30, HIT-55, HIT 60, HIT 70, HIT 80, and HIT 100, manufactured by Sumitomo Chemical Co., Ltd.; ERC-DBM, HP-DBM, and HPS-DBM manufactured by Reynolds Co.; WA 10000 manufactured by Fujimi Kenmazai Kogyo K.K.; UB 20 manufactured by C. Uyemura & Co., Ltd.; G-5, Kromex U2, and Kromex U1 manufactured by Nippon Chemical Industrial Co., Ltd.; TF 100 and TF 140 manufactured by Toda Kogyo Corp.; β-Random Ultrafine manufactured by Ibiden Co., Ltd.; and B-3 manufactured by Showa Industry Co., Ltd. These abrasive materials may be added also to the nonmagnetic layer according to need. The incorporation of an abrasive material in the nonmagnetic layer has the effect of regulating the surface shape or regulating the projecting state of an abrasive material. The particle diameter and amount of the abrasive material to be added to each of the magnetic layer and the nonmagnetic layer should, of course, be optimized.

Additives

Additives having a lubricating, antistatic, dispersing, plasticizing, or another effect may be used in the magnetic layer and nonmagnetic layer. Examples of such additives include molybdenum disulfide, tungsten disulfide, graphite, boron nitride, fluorinated graphite, silicone oils, silicones having a polar group, fatty acid-modified silicones, fluorine-containing silicones, fluorine-containing alcohols, fluorine-containing esters, polyolefins, polyglycols, esters of alkylphosphoric acids and alkali metal salts of the esters, esters of alkylsulfuric acids and alkali metal salts of the esters, poly(phenyl ether)s, phenylphosphonic acid, α-naphthylphosphoric acid, phenylphosphoric acid, diphenylphosphoric acid, p-ethylbenzenephosphonic acid, phenylphosphinic acid, aminoquinones, various silane coupling agents, titanium coupling agents, fluorine-containing alkylsulfuric acid esters and alkali metal salts of the esters, monobasic fatty acids having 10 to 24 carbon atoms (which may have an unsaturated bond or be branched) and metal salts (e.g., lithium, sodium, potassium, or copper salts) of these acids, mono-, di-, tri-, tetra-, penta-, and hexahydric alcohols having 12 to 22 carbon atoms (which may have an unsaturated bond or be branched), alkoxyalcohols having 12 to 22 carbon atoms, mono-, di-, or triesters of a monobasic fatty acid having 10 to 24 carbon atoms (which may have an unsaturated bond or be branched) with any one of mono-, di-, tri-, tetra-, penta-, and hexahydric alcohols having 2 to 12 carbon atoms (which may have an unsaturated bond or be branched), fatty acid esters of monoalkyl ethers of alkylene oxide polymers, fatty acid amides having 8 to 22 carbon atoms, and aliphatic amines having 8 to 22 carbon atoms.

Examples of the fatty acids include capric acid, caprylic acid, lauric acid, myristic acid, palmitic acid, stearic acid, behenic acid, oleic acid, elaidic acid, linoleic acid, linolenic acid, and isostearic acid. Examples of the esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, erucic acid oleyl, neopentyl glycol didecanoate, and ethylene glycol dioleate. Examples of the alcohols include oleyl alcohol, stearyl alcohol, and lauryl alcohol. Surfactants are also usable. Examples thereof include nonionic surfactants such as those of the alkylene oxide type, glycerol type, glycidol type, and alkylphenol ethylene oxide adduct type; cationic surfactants such as cyclic amines, ester amides, quaternary ammonium salts, hydantoin derivatives, heterocyclic compounds, and phosphonium or sulfonium compounds; anionic surfactants containing an acid radical such as a carboxylic acid, sulfonic acid, phosphoric acid, sulfate, or phosphate radical; and amphoteric surfactants such as amino acids, aminosulfonic acids, esters of sulfuric or phosphoric acid with amino-alcohols, and alkylbetaines. These surfactants are described in detail in *Kaimen Kasseizai Binran* (published by Sangyo Tosho K.K.). These additives including lubricants and antistatic agents need not be 100% pure, and may contain impurities such as isomers, unreacted products, by-products, decomposition products, oxidation products, etc., besides the main components. The content of these impurities is desirably 30% or lower, preferably 10% or lower.

Those lubricants and surfactants usable in the present invention have different physical functions, and the kinds and amounts of such ingredients and a lubricant proportion for producing a synergistic effect should be optimized according to purposes. Lubricants or surfactants may be used, for example, in the following manners: fatty acids having different melting points are used for the nonmagnetic layer and the magnetic layer, respectively, to control the bleeding to the surface; esters differing in boiling point, melting point, or polarity are used to control the bleeding to the surface; surfactant amounts are regulated to improve the stability of coating; and a larger lubricant amount is used for an interlayer to obtain an improved lubricating effect. It is a matter of course that manners of using lubricants or surfactants are not limited to these examples. In general, the total amount of the lubricants to be used is selected from the range of from 0.1 to 50%, preferably from 2 to 25%, based on the magnetic material or the nonmagnetic particles.

Part or all of the additives to be used in the present invention may be added at any step in the course of the production of a magnetic coating solution or nonmagnetic coating solution. Examples of addition techniques include: to mix the additives with a magnetic material prior to a kneading step; to add the additives during the step of kneading a magnetic material together with a binder and a solvent; to add the additives at a dispersing step; to add the additives after dispersion; and to add the additives immediately before coating. Some purposes may be accomplished by forming a magnetic layer by coating and then applying part or all of one or more additives simultaneously or successively according to the purposes. It is also possible to apply a lubricant to the surface of the magnetic layer after calendering or after completion of slitting, according to purposes. Well-known organic solvents can be used in the present invention. For example, the solvents shown in Japanese Patent Application (Laid-Open) No. 68453/1994 can be used.

Layer Constitution

In the layer constitution of the magnetic recording medium, the support has a thickness of generally from 2 to 100 $\mu$m, preferably from 2 to 80 $\mu$m. For computer tapes, a support having a thickness in the range of generally from 3.0 to 6.5 $\mu$m (preferably from 3.0 to 6.0 $\mu$m, more preferably from 4.0 to 5.5 $\mu$m) is used. Also, the magnetic layer has a thickness of preferably from 0.03 to 0.20 $\mu$m and more preferably from 0.05 to 0.15 $\mu$m. If the thickness is less than 0.03 $\mu$m, the reproduction output is very decreased. Also, if the thickness is more than 0.20 $\mu$m, the overwriting characteristics and resolution are deteriorated.

An undercoat layer may be formed between the support and the nonmagnetic layer or magnetic layer for the purpose of improving adhesion. This undercoat layer has a thickness of generally from 0.01 to 0.5 $\mu$m, preferably from 0.02 to 0.5 $\mu$m. The recording medium to be used in the present invention may be a disk-form medium prepared by forming a nonmagnetic layer and a magnetic layer on each side of a support, or may be a tape-form or disk-form medium prepared by forming these layers on only one side of a support. In the latter case, a back coat layer may be formed on the side opposite to the nonmagnetic layer and magnetic layer for the purpose of producing an antistatic effect, anticurling effect, etc. This back coat layer has a thickness of generally from 0.1 to 4 $\mu$m, preferably from 0.3 to 2.0 $\mu$m. The undercoat layer and back coat layer each may be a well-known layer.

The nonmagnetic layer has a thickness of generally from 0.2 to 5.0 $\mu$m, preferably from 0.3 to 3.0 $\mu$m, more preferably from 1.0 to 2.5 µm. The nonmagnetic layer produces its effects as long as it is substantially nonmagnetic. For example, the nonmagnetic layer may contain a slight amount of a magnetic material either as an impurity or as an ingredient purposely incorporated. It is a matter of course that such constitution can be regarded as substantially the same as that of the recording medium in which the nonmagnetic layer contains no magnetic material. The term "substantially nonmagnetic" as used herein generally means that the residual magnetic flux density of the nonmagnetic layer is 0.01 T or lower or the coercive force thereof is 7.96 kA/m (100 Oe) or lower, and preferably means that the nonmagnetic layer has no residual magnetic flux density and no coercive force.

Back Coat Layer

Compared to video tapes and audio tapes, the magnetic tapes for computer data recording generally are strongly required to have a high degree of suitability for repetitions of running. For maintaining the high degree of running durability required, the back coat layer preferably contains a carbon black and inorganic particles.

As the carbon black is preferably used a combination of two kinds of carbon blacks differing in average particle diameter. In this case, a preferred combination comprises a finely particular carbon black having an average particle diameter of from 10 to 20 nm and a coarse carbon black having an average particle diameter of from 230 to 300 nm. Addition of such a finely particulate carbon black is generally effective in regulating the back coat layer so as to have a low surface electrical resistance and a low light transmittance. Since there are many magnetic recording apparatus in which the light transmittance of a tape is utilized as a signal for operation, the addition of a finely particulate carbon black is especially effective in such a case. Furthermore, finely particulate carbon blacks generally have the high ability to hold a liquid lubricant and hence contribute to a reduction in coefficient of friction when a lubricant is used therewith in combination.

On the other hand, the coarse carbon black having an average particle diameter of from 230 to 300 nm not only functions as a solid lubricant but also forms minute projections on the surface of the back coat layer to reduce the contact area and thereby contribute to a reduction in coefficient of friction. However, use of the coarse carbon black alone has a drawback that when the tape is used under severe running conditions, carbon black particles are apt to fall down from the back coat layer due to tape sliding, leading to an increased error frequency.

Specific examples of commercial products of the finely particulate carbon black include the following. The average particle diameters thereof are shown in parentheses. RAVEN 2000B (18 nm) and RAVEN 1500B (17 nm) (manufactured by Columbian Carbon Co.); BP 800 (17 nm) (manufactured by Cabot Corp.); PRINTEX 90 (14 nm), PRINTEX 95 (15 nm), PRINTEX 85 (16 nm), and PRINTEX 75 (17 nm) (manufactured by Degussa AG); and #3950 (16 nm) (manufactured by Mitsubishi Chemical Industries Ltd.).

Specific examples of commercial products of the coarse carbon black include Thermal Black (270 nm) (manufactured by Cancarb Ltd.) and RAVEN MTP (275 nm) (manufactured by Columbian Carbon Co.).

When a finely particulate carbon black and coarse carbon black which have average particle diameters of from 10 to 20 nm and from 230 to 300 nm, respectively, are used in the back coat layer as two kinds of carbon blacks differing in average particle diameter, then the proportion (by weight) of the former to the latter carbon black is preferably in the range of from 98:2 to 75:25, more preferably from 95:5 to 85:15.

The amount of the carbon black (total carbon black amount when two or more carbon blacks are used) in the back coat layer is generally from 30 to 80 parts by weight, preferably from 45 to 65 parts by weight, per 100 parts by weight of the binder.

The inorganic particles to be used preferably comprise a combination of two particulate materials differing in hardness. For example, it is preferred to use soft inorganic particles having a Mohs' hardness of from 3 to 4.5 and hard inorganic particles having a Mohs hardness of from 5 to 9. Addition of the soft inorganic particles having a Mohs' hardness of from 3 to 4.5 is effective in stabilizing the coefficient of friction during repetitions of running. In addition, such soft inorganic particles, which have a hardness within that range, do not abrade sliding guide poles. These inorganic particles preferably have an average particle diameter in the range of from 30 to 50 nm.

Examples of the soft inorganic particles having a Mohs' hardness of from 3 to 4.5 include calcium sulfate, calcium carbonate, calcium silicate, barium sulfate, magnesium carbonate, zinc carbonate, and zinc oxide. These may be used alone or in combination of two or more thereof.

The amount of the soft inorganic particles contained in the back coat layer is in the range of preferably from 10 to 140 parts by weight, more preferably from 35 to 100 parts by weight, per 100 parts by weight of the carbon black.

Addition of the hard inorganic particles having a Mohs' hardness of from 5 to 9 enhances the strength of the back coat layer to improve running durability. When these inorganic particles are used in combination with a carbon black and the soft inorganic particles described above, the back coat layer has improved durability with reduced deterioration in repetitions of sliding. Furthermore, the addition of the hard inorganic particles imparts a moderate abrading ability to the layer to thereby diminish the adhesion of scratched powders to tape guide poles, etc. Especially when the hard inorganic particles are used in combination with the soft inorganic particles, the back coat layer has improved sliding properties on guide poles having a rough surface, whereby the coefficient of friction of the back coat layer can also be stabilized.

The hard inorganic particles preferably have an average particle size in the range of from 80 to 250 nm (more preferably from 100 to 210 nm).

Examples of the hard inorganic particles having a Mohs' hardness of from 5 to 9 include α-iron oxide, α-alumina, and chromium oxide ($Cr_2O_3$). These particulate materials may be used alone or in combination of two or more thereof. Preferred of these are α-iron oxide and α-alumina. The amount of the hard inorganic particles contained in the back coat layer is generally from 3 to 30 parts by weight, preferably from 3 to 20 parts by weight, per 100 parts by weight of the carbon black.

When soft inorganic particles and hard inorganic particles are to be used in combination in the back coat layer, these two kinds of inorganic particles are preferably ones selected so that the difference in hardness between the soft inorganic particles and the hard inorganic particles is 2 or more (more preferably 2.5 or more, most preferably 3 or more).

The back coat layer preferably contains the two particulate inorganic materials differing in Mohs' hardness and each having a specific average particle size and further contains the two carbon blacks differing in average particle size.

A lubricant can be incorporated into the back coat layer. One or more lubricants suitably selected from the lubricants enumerated above as lubricants usable in the nonmagnetic layer or magnetic layer described above may be used. The amount of the lubricant to be added to the back coat layer is generally from 1 to 5 parts by weight per 100 parts by weight of the binder.

Support

The support used in the present invention is not particularly limited. However, the support is preferably a substantially nonmagnetic flexible support. Also, one in which the surface property is controlled is preferred as described above.

As the flexible support for use in the present invention can be employed a well-known film. Examples thereof include films of polyesters such as poly(ethylene terephthalate) and poly(ethylene naphthalate), polyolefins, cellulose triacetate, polycarbonates, aromatic polyamides, aliphatic polyamides, polyimides, poly(amide-imide)s, polysulfones, and polybenzoxazole. Preferred of these are high-strength supports made of poly(ethylene naphthalate), a polyamide, or the like. A laminate support such as that described in Japanese Patent Application (Laid-Open) No. 224127/1991 may be used according to need so that the magnetic layer surface and the base surface differ in surface roughness. These supports may be subjected beforehand to corona discharge treatment, plasma treatment, easy adhesion treatment, heat treatment, dust-removing treatment, etc. An aluminum or glass base may be also used as the support.

Supports advantageously usable for achieving the purpose of the present invention are ones which have a central-plane average surface roughness Ra as measured with TOPO-3D, manufactured by WYKO Corp., of generally 8.0 nm or lower, preferably 4.0 nm or lower, more preferably 2.0 nm or lower. Besides having such a low central-plane average surface roughness, these supports are required to be preferably free from projections as large as 0.5 µm or more. The state of the surface roughness can be freely controlled by regulating the size and amount of a filler which is incorporated into the support according to need. Examples of the filler include oxides or carbonates of calcium, silicon, and titanium and fine organic powders such as acrylic powders. The support preferably has a maximum height $R_{max}$ of 1 µm or smaller, a ten-point average roughness $R_z$ of 0.5 µm or lower, a central-plane peak height $R_p$ of 0.5 µm or smaller, a central-plane valley depth $R_v$ of 0.5 µm or smaller, a central-plane areal ratio $S_r$ of from 10 to 90%, and an average wavelength $\lambda_a$ of from 5 to 300 µm. The surface projections on the support can be controlled with a filler so as to have any desired distribution, for the purpose of obtaining the desired electromagnetic characteristics and durability. The number of surface projections respectively having sizes of various ranges of from 0.01 µm to 1 µm can be regulated so as to be from 0 to 2,000 per 0.1 mm². The support to be used in the present invention has an F-5 value of preferably from 5 to 50 kg/mm² (49 to 490 MPa). The degree of thermal shrinkage of the support as measured under the conditions of 100° C. and 30 minutes is preferably 3% or lower, more preferably 1.5% or lower, and the degree of thermal shrinkage thereof as measured under the conditions of 80° C. and 30 minutes is preferably 1% or lower, more preferably 0.5% or lower. The strength at break of the support is preferably from 5 to 100 kg/mm² (=about 49 to 980 MPa), and the modulus of elasticity thereof is preferably from 100 to 2,000 kg/mm² (=about 0.98 to 19.6 GPa). The thermal expansivity of the support is generally from $10^{-4}$ to $10^{-8}/°$ C., preferably from $10^{-5}$ to $10^{-6}/°$ C., and the hygroexpansivity thereof is generally $10^{-4}$/RH % or lower, preferably $10^{-5}$/RH % or lower. It is preferred that the support be almost homogeneous in each of these thermal, dimensional, and mechanical properties in such a degree that the difference in each property between any in-plane directions in the support is within 10%.

Process for Production

A process for producing a magnetic coating solution or nonmagnetic coating solution to be used for producing the magnetic recording medium comprises at least a kneading step and a dispersing step, and may further comprise a mixing step which may optionally be conducted before and after the two steps. Each step may include two or more stages. Each of the materials for use in the present invention, including a magnetic material, nonmagnetic particles, binder, carbon black, abrasive material, antistatic agent, lubricant, and solvent, may be added in any step either at the beginning of or during the step. Furthermore, each raw material may be added portion-wise in two or more steps. For example, a polyurethane may be added portion-wise so that it is added in each of the kneading step, dispersing step, and mixing step for viscosity adjustment after the dispersion. Well-known manufacturing techniques can be used as part of the process. In the kneading step is preferably used a kneading machine having a high kneading power, such as an open kneader, continuous kneader, pressure kneader, or extruder. In the case of using a kneader, the magnetic material or nonmagnetic particles are kneaded together with all or part (preferably at least 30%) of the binder, the binder amount being in the range of from 15 to 500 parts per 100 parts of the magnetic material. Details of this kneading treatment are given in Japanese Patent Application (Laid-Open) Nos. 106338/1989 and 79274/1989. Although glass beads can be used for particle dispersion in preparing coating solutions respectively for forming a magnetic layer and a nonmagnetic layer, it is preferred to use zirconia beads, titania beads, or steel beads, which are dispersing media having a high specific gravity. Such a dispersing medium optimized in particle diameter is used in an optimal loading (i.e., filling rate). Well-known dispersing machines can be used.

In the case where a magnetic recording medium having a multilayer constitution according to the present invention is prepared through coating, it is preferred to use any of the following methods.

The first method is to firstly form a lower layer through coating with a coating apparatus generally used for applying magnetic coating solutions, e.g., a gravure coating, roll coating, blade coating, or extrusion coating apparatus, and then form an upper layer, while the lower layer is still in a wet state, through coating with the support-pressing extrusion coater disclosed in Japanese Patent Publication No. 46186/1989 or Japanese Patent Application (Laid-Open) No. 238179/1985 or 265672/1990.

The second method is to almost simultaneously form an upper layer and a lower layer through coating with a single coating head having therein two slits for passing coating solutions, such as those disclosed in Japanese Patent Application (Laid-Open) Nos. 88080/1988, 17971/1990, and 265672/1990.

The third method is to almost simultaneously form an upper layer and a lower layer through coating with the extrusion coater equipped with a back-up roll as disclosed in Japanese Patent Application (Laid-Open) No. 174965/1990.

For preventing the electromagnetic characteristics and other properties of the magnetic recording medium from being impaired by cohesion of magnetic particles, it is desirable to apply a shearing force to the coating solution in the coating head by a method such as those disclosed in Japanese Patent Application (Laid-Open) Nos. 95174/1987 and 236968/1989. The viscosity of each coating solution should be in the range specified in Japanese Patent Application (Laid-Open) No. 8471/1991.

For realizing a multilayer constitution, successive multiple coating may, of course, be used in which a coating solution is applied and dried to form a lower layer and a magnetic layer is then formed thereon. However, from the standpoint of diminishing coating defects to improve quality such as freedom from dropouts, it is preferred to use any of the techniques for simultaneous multiple coating described above.

In the case of producing a disk, it is preferred to use a well-known apparatus for random orientation in which magnetic particles are randomly oriented, for example, with cobalt magnets alternately arranged in oblique directions or by applying an alternating magnetic field with a solenoid, although sufficiently isotropic orientation is obtainable even without an orientation treatment with an orientation apparatus. In the case of fine ferromagnetic metal particles, the isotropic orientation generally preferably is in-plane two-dimensional random orientation but the particles can be three-dimensionally randomly oriented so as to include a vertically oriented component. Although hexagonal ferrites are generally apt to undergo three-dimensional random orientation with respect to in-plane and vertical directions, they can be two-dimensionally randomly oriented in in-plane directions. It is also possible to vertically orient the magnetic particles by a well-known technique, e.g., with heteropolar-facing magnets to impart magnetic properties which are isotropic in circumferential directions. Vertical orientation is preferred especially for high-density recording. Spin coating may be performed to conduct circumferential orientation.

In the case of a magnetic tape, a cobalt magnet or solenoid is used to orient the magnetic particles in the machine direction. It is preferred that the place in which the coating film is dried be made controllable by regulating the temperature and amount of the air fed for drying and the rate of coating. The rate of coating is preferably from 20 to 1,000 m/min and the temperature of the drying air is preferably 60° C. or higher. Predrying may be performed to an appropriate degree before the coated support enters the magnet zone.

After the coating and drying, the magnetic recording medium is usually subjected to a calendering treatment. In the calendering treatment, the coated support is treated with plastic calendering rolls made of a heat-resistant plastic, e.g., an epoxy, polyimide, polyamide, or poly(imide-amide), or with metallic calendering rolls. Especially when the support has a magnetic layer on each side, the coated support is preferably calendered between metal rolls. The calendering temperature is preferably 50° C. or higher, more preferably 100° C. or higher. The linear pressure is preferably 200 kg/cm (196 kN/m) or higher, more preferably 300 kg/cm (294 kN/m) or higher.

Physical Characteristic

Saturation magnetic flux density of the magnetic layer of the magnetic recording medium in the present invention is desirably 0.1 to 0.3 T. Coercive force Hc of the magnetic layer is desirably 159 (2000 Oe) to 398 kA/m (5000 Oe), more desirably 159 to 239 kA/m (2000 to 3000 Oe). As to the dispersion of the coercive force, the narrower, the more preferable, and SFD is preferably 0.6 or less.

In the magnetic disk, as to squareness ratios, in the case of the second dimensional random, the squareness ratio is 0.55 to 0.67, preferably more than 0.58 to 0.64, in the case of the three dimensional random, it is preferably 0.4 to 0.55, in the case of the vertical orientation, it is 0.6 or more in the vertical direction, preferably 0.7 or more, in the case of correcting a demagnetization, it is 0.7 or more, preferably 0.8 or more. In both of the two dimensional random and three dimensional random, ratios of the orientations are preferably 0.8 or more. In the case of the two dimensional random, the squareness ratio in the vertical direction, Br and Hc are preferably 0.1 to 0.5 in the in-plane direction.

In the case of a magnetic tape, the squareness ratio of the magnetic layer is generally 0.55 or higher, preferably 0.7 or higher. The coefficient of friction of the magnetic recording medium with heads in the present invention is generally 0.5 or lower, preferably 0.3 or lower, in the temperature range of from $-10°$ C. to 40° C. and the humidity range of from 0 to 95%. The intrinsic surface resistivity of the magnetic recording medium on the magnetic layer side is preferably from $10_4$ to $10_{12}$ Ω/sq, and the electrification potential thereof is preferably from $-500$ to $+500$ V. The modulus of elasticity at 0.5% elongation of the magnetic layer is preferably from 100 to 2,000 kg/mm² (0.98 to 19.6 GPa) in any in-plane direction, and the strength at break thereof is preferably from 10 to 70 kg/mm² (98 to 686 MPa). The modulus of elasticity of the magnetic recording medium is preferably from 100 to 1,500 kg/mm² (0.98 to 14.7 GPa) in any in-plane direction, the residual elongation thereof is preferably 0.5% or lower, and the degree of thermal shrinkage thereof as measured at any temperature not higher than 100° C. is preferably 1% or lower, more preferably 0.5% or lower, most preferably 0.1% or lower. The glass transition temperature (the temperature corresponding to a maximum of loss modulus in a dynamic viscoelasticity measurement made at 110 Hz) of the magnetic layer is preferably from 50 to 120° C., while that of the lower nonmagnetic layer is preferably from 0 to 100° C. The loss modulus is preferably in the range of from $1\times10^9$ to $8\times10^{10}$ μN/cm², and the loss tangent is preferably 0.2 or smaller. Too large loss tangents tend to result in sticking troubles. It is preferred that the medium be almost homogeneous in each of these thermal and mechanical properties in such a degree that the difference in each property between any in-plane directions in the medium is within 10%. The residual solvent content in the magnetic layer is preferably 100 mg/m² or lower, more preferably 10 mg/m² or lower. The void content in each of the coating layers, i.e., the nonmagnetic layer and magnetic layer, is preferably 30% by volume or lower, more preferably 20% by volume or lower. Although a lower void content is desirable for attaining higher output, there are cases where a certain degree of void content is advantageous for some purposes. For example, in the case of disk media for which suitability for repetitions of running is important, higher void contents frequently bring about better running durability.

The central-plane average surface roughness Ra of the magnetic layer as measured with TOPO-3D, manufactured by WYKO Corp., over an area of about 250 μm×250 μm is generally 4.0 nm or lower, preferably 3.8 nm or lower, more preferably 3.5 nm or lower. The magnetic layer preferably further has a maximum height $R_{max}$ of 0.5 μm or smaller, a ten-point average roughness $R_z$ of 0.3 μm or lower, a central-plane peak height $R_p$ of 0.3 μm or smaller, a central-plane valley depth $R_v$ of 0.3 μm or smaller, a central-plane areal ratio $S_r$ of from 20 to 80%, and an average wavelength $\lambda_a$ of from 5 to 300 μm. The surface projections present on the magnetic layer are preferably regulated so as to meet those surface properties to thereby optimize the electromagnetic characteristics and coefficient of friction of the layer. The state of these surface projections can be easily controlled by controlling the surface state of the support with a filler and by regulating the particle diameter and amount of the filler to be added to the magnetic layer as stated above or regulating the surface shape of the rolls to be used for calendering, etc. The curling of the magnetic recording medium is preferably regulated so as to be within ±3 mm.

In the case where the magnetic recording medium has a nonmagnetic layer and a magnetic layer, it can be made to have a difference in any of those physical properties between the nonmagnetic layer and the magnetic layer according to purposes, as can be easily presumed. For example, the magnetic layer is made to have a heightened modulus of elasticity to improve running durability and, at the same time, the nonmagnetic layer is made to have a lower modulus of elasticity than the magnetic layer to improve the head touching of the magnetic recording medium.

EXAMPLES

The present invention will be explained below in more detail by reference to Examples, but the present invention should not be construed as being limited thereto. In the following Examples and Comparative Examples, all "parts" are by weight.

Production of Coating Solution

| Magnetic coating solution 1 (Hexagonal system ferrite: Disk): | |
| --- | --- |
| Barium ferrite magnetic particle | 100 parts |
| Average tabular diameter: 30 nm, | |
| Average tabular ratio: 3, | |
| Hc: 2300 Oe (= about 184 kA/m), | |
| σ s: 54 A · m²/kg | |
| Vinyl chloride copolymer | |
| MR555 (made by Nippon Zeon Co., Ltd.) | 10 parts |
| Diamond fine particle (average diameter: 0.20 μm) | 1.5 parts |
| Carbon black | |
| #55 (made by Asahi Carbon Co., ltd.) | 0.5 parts |
| Isohexadecylstearate | 5 parts |
| Stearic acid | 1 part |
| Oleic acid | 1 part |
| Methylethylketon | 120 parts |
| cyclohexanone | 80 parts |
| Magnetic coating solution 2 (Hexagonal system ferrite: Tape): | |
| Barium ferrite magnetic particle | 100 parts |
| Average tabular diameter: 26 nm, | |
| Average tabular ratio: 3, | |
| Hc: 2500 Oe (= about 200 kA/m), | |
| σ s: 51 A · m²/kg | |
| Vinyl chloride copolymer | |
| MR555 (made by Nippon Zeon Co., Ltd.) | 10 parts |
| α-alumina | |
| HIT60A (made by Sumitomo Chemical Co., Ltd.) | 8 parts |
| Carbon black (Average diameter: 0.015 μm) | |
| #55 (made by Asahi Carbon Co., ltd.) | 0.5 parts |
| Stearic acid | 0.5 part |
| Butyl stearate | 2 parts |
| Methylethylketon | 230 parts |
| Cyclohexanone | 150 parts |
| Non-Magnetic coating solution 1 (Non-magnetic lower layer: Disk): | |
| Non-magnetic particle: α-iron oxide | 100 parts |
| Average long axis length: 0.09 μm, | |
| Specific surface area by the BET method: 50 m²/g | |
| pH: 7 | |
| DBP oil absorption amount: 27 to 28 g/100 g | |
| Surface-treated layer: Al₂O₃ (8 wt %) | |
| Carbon black | |
| Conduktex SC-U (made by Colombian Carbon Inc.) | 25 parts |

| -continued | |
| --- | --- |
| Vinyl chloride copolymer | |
| MR104 (made by Nippon Zeon Co., Ltd.) | 13 parts |
| Polyurethane resin | |
| UR8200 (made by Toyo Spinning Co., Ltd.) | 5 parts |
| Phenyl phosphonic acid | 3.5 parts |
| Isohexadecylstearate | 6 parts |
| Oleic acid | 1.3 parts |
| Stearic acid | 1.3 parts |
| Methylethylketon | 230 parts |
| Cyclohexanone | 155 parts |
| Non-Magnetic coating solution 1 (Non-magnetic lower layer: Tape): | |
| Non-magnetic particle: α-iron oxide | 100 parts |
| Average long axis length: 0.09 μm, | |
| Specific surface area by the BET method: 50 m²/g | |
| pH: 7 | |
| DBP oil absorption amount: 27 to 28 g/100 g | |
| Surface-treated layer: Al₂O₃ (8 wt %) | |
| Carbon black | |
| Conduktex SC-U (made by Colombian Carbon Inc.) | 25 parts |
| Vinyl chloride copolymer | |
| MR104 (made by Nippon Zeon Co., Ltd.) | 13 parts |
| Polyurethane resin | |
| UR8200 (made by Toyo Spinning Co., Ltd.) | 5 parts |
| Phenyl phosphonic acid | 3.5 parts |
| Butyl stearate | 1 part |
| Stearic acid | 2 parts |
| Methylethylketon | 205 parts |
| Cyclohexanone | 135 parts |

Producing Method 1: Disk (Disks Nos. 1 to 8)

Production of Disk No. 1

As to the magnetic coating solution 1 and the non-magnetic coating solution 1, the respective components were kneaded by the kneader, and the dispersing liquid was circulated 10 times and dispersed by a sand mill. To the coating solution for the non-magnetic layer, 6.5 parts of polyisocyanate was added and further 7 parts of methylethylketon was added, and the obtained solution was screened through a filter having average pore diameter of 1 μm, so that the coating solutions were respectively prepared for forming the non-magnetic layer and the magnetic layer for disks.

The obtained non-magnetic layer coating solution was coated in the simultaneous multi-layer coating on the polyethylene terephtharate support (described in Table 1) having a thickness of 62 μm such that a thickness after drying was 1.5 μm and a thickness of the magnetic layer thereon was 0.15 μm, and the treatment was carried out with the calenders of 7 steps after drying at temperature of 90° C. and the linear pressure of 300 kg/cm (294 kN/m). The operation thereof was performed on both surfaces of the support, and the support was punched out to 3.5 inch disk and then subjected to surface polishing treatment to produce the Disk No. 1.

Production of Disk Nos. 2 to 8

The magnetic disks were prepared through the above described method in the production of Disk No. 1, except for the power spectrum of density where the surface roughness was frequency-analyzed and except that the number of the surface projections were changed to those of the support described in Table 1. Number of surface projections:

The projections (i.e., protrusions) existing in the area of 100 mm² of the surface of the support were marked, and the height was measured with HD2000 made by WYKO CO., LTD., and the number of projections having a height of 0.1 to 0.5 μm was counted.

TABLE 1

| Disk No. | Power spectrum of density at spatial frequency of 100/mm (nm³) | Power spectrum of density at spatial frequency of 500/mm (nm³) | Number of projections (Piece number/mm²) | Material |
|---|---|---|---|---|
| 1 | 30000 | 1200 | 0.6 | Polyethylene terephthalate |
| 2 | 30000 | 1300 | 0.05 | Polyethylene terephthalate |
| 3 | 60000 | 4500 | 0.07 | Polyethylene terephthalate |
| 4 | 30000 | 6000 | 0.05 | Polyethylene terephthalate |
| 5 | 30000 | 200 | 0.4 | Polyamide |
| 6 | 45000 | 2000 | 0.3 | Polyethylene naphthalate |
| 7 | 30000 | 4800 | 0.1 | Polyethylene naphthalate |
| 8 | 30000 | 300 | 0.02 | Polyethylene naphthalate |

Production of Disk Nos. 9 to 12

Disk Nos. 9 to 12 were prepared in the same manner as described above, except that the barium ferrite used in the item "Production of coating solution" described above was changed to barium ferrite in Table 2.

TABLE 2

| Disk No. | Average tabular diameters (nm) | Average tabular ratio | δs (A·m²/kg) | Hc (kA/m) |
|---|---|---|---|---|
| 9 | 40 | 3 | 56 | 184 |
| 10 | 35 | 3 | 54 | 184 |
| 11 | 17 | 3 | 48 | 184 |
| 12 | 13 | 3 | 43 | 184 |

Production of Disks Nos. 13 to 17

Disk No.13 was similarly prepared in the same manner as in Disk No. 4, except that the calendering conditions of temperature of 95° C. and the linear pressure of 400 Kg/cm were used.

Disk No. 14 was prepared in the same manner as in Disk No. 3, except that the dispersion of the magnetic coating solution was carried out 1.5 times (circulations of 15 times).

Disk No. 15 was prepared in the same manner as in Disk No. 2, except that the average diameter and amount of the α-alumina were changed to 0.35 μm and to 12 parts, respectively, in the treated upper layer of Disk No. 2.

Disk No. 16 was prepared by coating only the lower layer coating solution in the method of Disk No. 4, and calender-treating, coating the upper layer, and again calender-treating.

Disk No. 17 was prepared by varnishing Disk No. 3 with a polishing tape of No. 8000.

Producing Method 2: Computer Tape (Tapes Nos. 1 to 8)

Production of Tape No. 1

As to the magnetic coating solution 2 and the non-magnetic coating solution 2, the respective components were kneaded by the kneader, and the kneaded solution was circulated 10 times and dispersed by a sand mill. To the coating solution of the non-magnetic layer, 2.5 parts of polyisocyanate was added and further the 3 parts of methylethylketon was added, and the obtained solution was screened through a filter having average pore diameter of 1 μm, so that the coating solutions were respectively prepared for forming the non-magnetic layer and the magnetic layer.

The obtained non-magnetic layer coating solution was coated in the simultaneous multi-layer coating on the support of polyethylene terephtharate (described in Table 3) such that a thickness after drying was 1.5 μm and a thickness of the magnetic layer thereon was 0.10 μm, and while both layers were wet, they were orientated by a cobalt magnet of magnetic force being 600 mT and a solenoid of magnetic force being 600 mT. After drying, the layers were treated with the calenders of 7 steps at temperature of 90° C. and 200 m/min, coated with a back layer of 0.5 μm in thickness (100 parts of carbon black, average size: 17 nm, 80 parts of calcium carbonate, average size: 40 nm, and 5 parts of α-alumina, average size: 200 nm, were dispersed into the nitrocellulose resin, polyurethane resin and polyisocyanate), and the coated support was slit into 3.8 mm width. The slit products were sent and attached to an apparatus having a winding unit such that a non-woven cloth and a razor blade were pressed on a magnetic face, and the surface of magnetic layer was cleansed with a tape cleaning apparatus.

Production of Tapes Nos. 2 to 8

The magnetic tapes were prepared in the same manner as in the production of Tape No. 1, except for the power spectrum of density where the surface roughness was frequency-analyzed and except that the number of the surface projections were changed to those of the support described in Table 3.

Number of Surface Projections

The projections existing in the area of 100 mm² of the surface of the support were marked, and the height was measured with HD2000 made by WYKO CO., LTD., and the number projections having a height of 0.1 to 0.5 μm was counted.

TABLE 3

| Tape No. | Power spectrum of density at spatial frequency of 100/mm (nm³) | Power spectrum of density at spatial frequency of 500/mm (nm³) | Number of projections (Piece number/mm²) | Material |
|---|---|---|---|---|
| 1 | 42000 | 1400 | 0.6 | Polyethylene terephthalate |
| 2 | 40000 | 1600 | 0.05 | Polyethylene terephthalate |
| 3 | 55000 | 4200 | 0.07 | Polyethylene terephthalate |
| 4 | 32000 | 6200 | 0.05 | Polyethylene terephthalate |
| 5 | 33000 | 220 | 0.4 | Polyamide |
| 6 | 47000 | 2400 | 0.3 | Polyethylene naphthalate |
| 7 | 31000 | 4800 | 0.1 | Polyethylene naphthalate |
| 8 | 28000 | 280 | 0.02 | Polyethylene naphthalate |

Production of Tapes Nos. 9 to 12

The magnetic Tape Nos. 9 to 12 were prepared in the same manner as in Tape No. 1, except that the barium ferrite used in the item "Production of coating solution" described above was changed to barium ferrite of the under Table 4.

TABLE 4

| Tape No. | Average tabular diameters (nm) | Average tabular ratio | Δs (A·m²/kg) | Hc (kA/m) |
|---|---|---|---|---|
| 9 | 40 | 3 | 56 | 184 |
| 10 | 35 | 3 | 54 | 184 |
| 11 | 17 | 3 | 48 | 184 |
| 12 | 13 | 3 | 43 | 184 |

Production of Tape Nos. 13 to 17

Tape No. 13 was prepared in the same manner as in Tape No. 4, except that the calendering conditions of temperature of 95° C. and linear pressure of 400 Kg/cm were used.

Tape No. 14 was prepared in the same manner as in Tape No. 3, except that the dispersion of the magnetic coating solution was carried out 1.5 times (circulations of 15 times).

Tape No. 15 was prepared in the same manner as in Tape No. 2, except that the average diameter and amount of the diamond particles were changed to 0.35 μm and 3 parts, respectively, in the treated upper layer of Tape No. 2.

Tape No. 16 was prepared by coating only the lower layer coating solution in the method of Tape No. 4, and calender-treating, coating the upper layer, and again calender-treating.

Tape No. 17 was prepared by treating Tape No. 3 with the razor blade.

The respective samples of the obtained disks and tapes were evaluated as under, and results are shown in Tables 5 and 6.

(1) Power Spectrum of Density

The surface coarseness in the area of 250 μm×250 μm was measured with a non-contact type surface roughness meter made by WYKO, and frequency-analyzed for measuring the power spectrum of density at a spatial frequency of 100/mm and 500/mm, respectively.

(2) Output, Noises, and Thermal Asperity (disk)

The recording head (MIG, gap: 0.15 μm and 1.8 T) and the reproducing MR head were attached to a spin stand for measuring them. As to the thermal asperity, the generating number in 1 truck was counted. Rotation number was 3600 rpm, radius was 30 mm, and noise was DC noise.

(3) Output, Noises, and Thermal Asperity (tape)

The recording head (MIG, gap: 0.15 m and 1.8T) and the reproducing MR head were attached to a drum stator for measuring them. As to the thermal asperity, the number generating in reproduction of 20 m sec was counted. Head-media relative speed was 15 m/sec, and noise was modulation noise.

TABLE 5

<Results of evaluating magnetic disks>

| Disk No | | A | B | C | Output (dB) | Noises (dB) | Thermal asperity (Piece number/track) |
|---|---|---|---|---|---|---|---|
| 1 | Ex. | 30 | 5000 | 320 | 2 | −2.6 | 10 |
| 2 | Ex. | 30 | 5000 | 300 | 2 | −3 | 0 |
| 3 | Com. | 30 | 12000 | 400 | 0 | 0 | 2 |
| 4 | Com. | 30 | 5000 | 650 | 1 | −0.5 | 1 |
| 5 | Com. | 30 | 5000 | 40 | 2 | 0.5 | 7 |
| 6 | Ex. | 30 | 9000 | 300 | 1.5 | −1.5 | 0 |
| 7 | Ex. | 30 | 6000 | 450 | 2 | −1.3 | 2 |
| 8 | Ex. | 30 | 5000 | 60 | 2 | −1.7 | 0 |
| 9 | Com. | 40 | 11000 | 650 | 0.5 | 2 | 6 |
| 10 | Ex. | 35 | 6000 | 400 | 1.7 | −1.5 | 0 |
| 11 | Ex. | 17 | 7000 | 400 | 1.1 | −2.5 | 1 |
| 12 | Com. | 13 | 15000 | 700 | −1.5 | −2.3 | 0 |
| 13 | Ex. | 30 | 6000 | 450 | 2 | −2 | 0 |
| 14 | Ex. | 30 | 7000 | 400 | 1.8 | −2 | 1 |
| 15 | Com. | 30 | 7000 | 800 | 1.2 | 0 | 6 |
| 16 | Ex. | 30 | 6000 | 60 | 1.8 | −1.2 | 0 |
| 17 | Ex. | 30 | 7000 | 400 | 1.2 | −0.9 | 1 |

Ex.: Example
Com.: Comparative Example
A: Average diameters of Ba ferrite grains
B: Power spectrum of density at a spatial frequency of 100/mm (nm³)
C: Power spectrum of density at a spatial frequency of 500/mm (nm³)

TABLE 6

<Results of evaluating magnetic tapes>

| Tape No | | A | B | C | Output (dB) | Noises (dB) | Thermal asperity (Piece number/track) |
|---|---|---|---|---|---|---|---|
| 1 | Ex. | 26 | 4300 | 300 | 3.2 | −1 | 12 |
| 2 | Ex. | 26 | 4500 | 280 | 3.4 | −1.5 | 0 |
| 3 | Com. | 26 | 11000 | 380 | 0 | 0 | 0 |
| 4 | Com. | 26 | 4300 | 620 | 2.5 | 0.5 | 2 |
| 5 | Com. | 26 | 4500 | 40 | 2.2 | 1 | 6 |
| 6 | Ex. | 26 | 8500 | 290 | 3.2 | −1 | 0 |
| 7 | Ex. | 26 | 5500 | 430 | 2.8 | −1.5 | 1 |
| 8 | Ex. | 26 | 4800 | 55 | 3 | −1.8 | 1 |
| 9 | Com. | 40 | 12000 | 670 | 2.2 | 2.2 | 6 |
| 10 | Ex. | 35 | 6500 | 420 | 2.6 | −1.2 | 0 |
| 11 | Ex. | 17 | 7100 | 380 | 2 | −2.4 | 0 |
| 12 | Com. | 13 | 17000 | 650 | −3 | −3.5 | 1 |
| 13 | Ex. | 26 | 5000 | 430 | 2.5 | −1.5 | 0 |
| 14 | Ex. | 26 | 7200 | 370 | 2.2 | −1.3 | 1 |
| 15 | Com. | 26 | 7500 | 820 | 1.8 | 1.8 | 5 |
| 16 | Ex. | 26 | 6200 | 55 | 1.6 | −1.8 | 0 |
| 17 | Ex. | 26 | 7100 | 360 | 2.8 | −1.2 | 0 |

Ex.: Example
Com.: Comparative Example
A: Average diameters of Ba ferrite grains
B: Power spectrum of density at a spatial frequency of 100/mm (nm³)
C: Power spectrum of density at a spatial frequency of 500/mm (nm³)

As described above, the magnetic recording medium according to the present invention is excellent in output, noises, or thermal asperity.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A magnetic recording medium for reproduction of MR head comprising a support having thereon a substantially non-magnetic low layer and a magnetic layer comprising ferromagnetic hexagonal system ferrite particles dispersed in a binder, in this order, wherein a power spectrum of density at a spatial frequency of 100/mm having frequency-analyzed a surface roughness of the magnetic layer is 10,000 nm$^3$ or less, the power spectrum of density at a spatial frequency of 500/mm is 50 to 500 nm$^3$, and an average tabular diameter of the ferromagnetic hexagonal system ferrite particles is 15 to 35 nm.

2. The magnetic recording medium as in claim 1, wherein the power spectrum of density at a spatial frequency of 100/mm having frequency-analyzed the surface roughness of the support, is 50,000 nm$^3$ or less, and the power spectrum of density at a spatial frequency of 500/mm is 100 to 5000 nm$^3$.

3. The magnetic recording medium as in claim 1, wherein the projections having a height of 0.1 to 0.5 µm which are present on the surface of the support, are 0.5 pieces/mm$^2$ or less.

4. The magnetic recording medium as in claim 1, wherein that the magnetic recording medium is disk- or tape-shaped.

* * * * *